(12) United States Patent
Prentice

(10) Patent No.: US 8,979,102 B1
(45) Date of Patent: *Mar. 17, 2015

(54) RETRACTABLE WHEEL FAIRINGS FOR MOTOR VEHICLES

(71) Applicant: Michael Prentice, Reno, NV (US)

(72) Inventor: Michael Prentice, Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/092,548

(22) Filed: Nov. 27, 2013

(51) Int. Cl.
*B62D 25/16* (2006.01)
*B62D 35/00* (2006.01)
*B62D 25/18* (2006.01)

(52) U.S. Cl.
CPC .............. *B62D 35/00* (2013.01); *B62D 25/186* (2013.01); *B62D 25/163* (2013.01)
USPC ........................... 280/124.1; 701/49; 296/198

(58) Field of Classification Search
CPC .... B62D 25/16; B62D 25/163; B62D 25/186; B62D 35/00; B62D 35/02
USPC ........................... 280/124.1; 701/49; 296/198
See application file for complete search history.

(56) References Cited

U.S. PATENT DOCUMENTS

| 6,007,102 A * | 12/1999 | Helmus | 280/849 |
| 8,260,519 B2 * | 9/2012 | Canfield | 701/74 |
| 8,731,781 B2 * | 5/2014 | Prentice | 701/49 |

* cited by examiner

*Primary Examiner* — Ruth Ilan
*Assistant Examiner* — Timothy Wilhelm
(74) *Attorney, Agent, or Firm* — Gerry J. Elman; Elman Technology Law, P.C.

(57) ABSTRACT

A retractable wheel fairing device for decreasing the aerodynamic drag and/or increasing downforce of a vehicle is described. The device includes a fairing body with a suspension-mounted support system such that the fairing body, when deployed, reciprocates up and downwardly with the corresponding wheel of the vehicle. The suspension-mounted support system is adapted to functionally or physically disengage the wheel fairing device from the suspension of the vehicle upon lifting of the wheel fairing device with a separate retraction system.

15 Claims, 10 Drawing Sheets

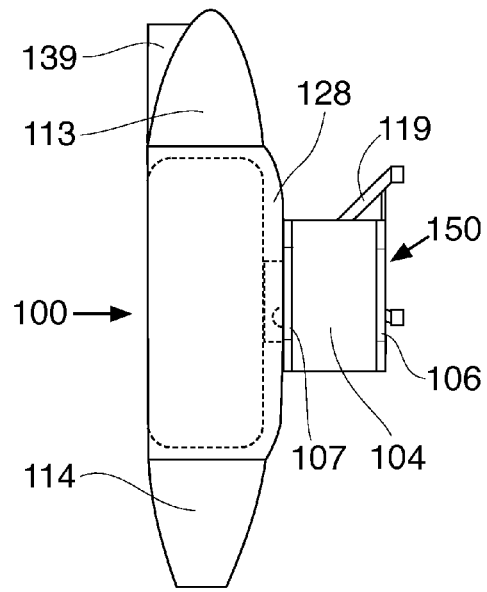
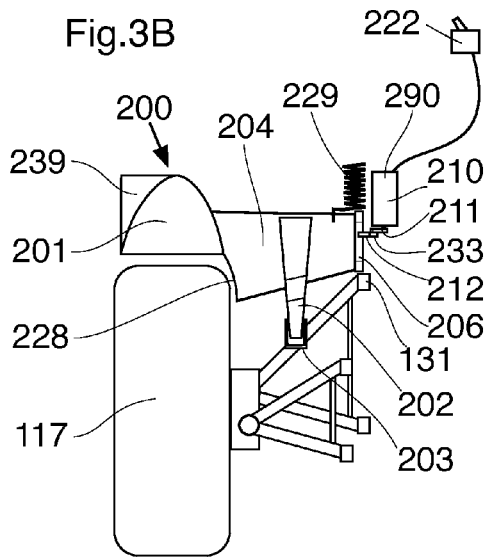
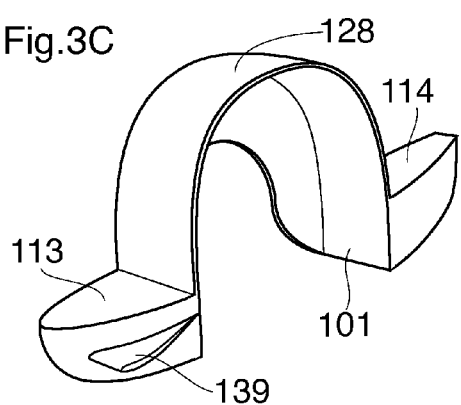
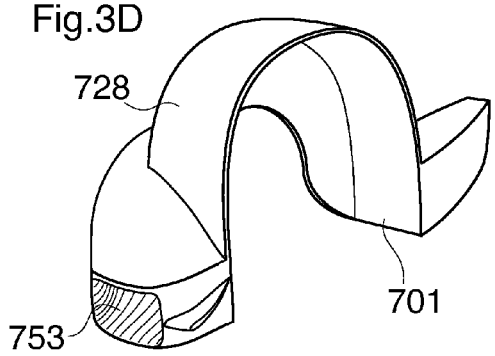

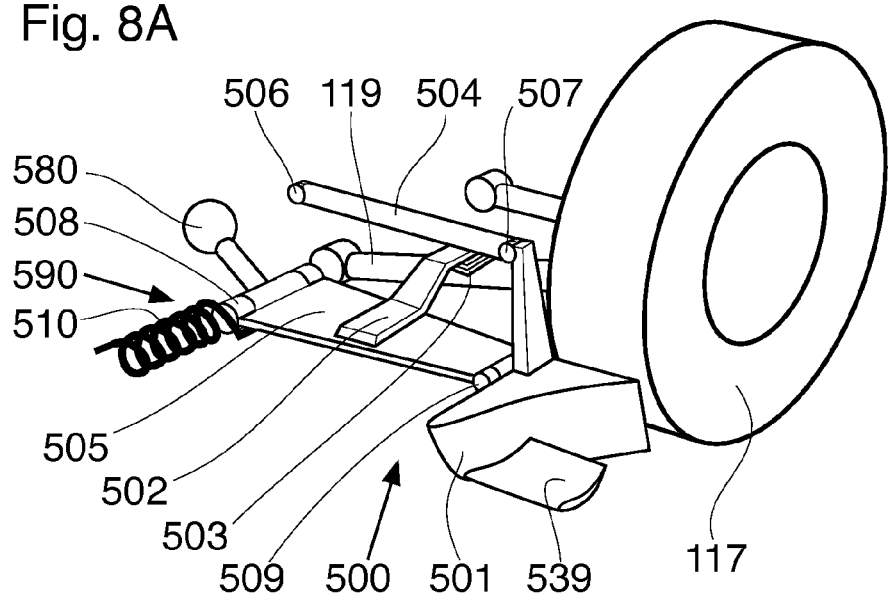
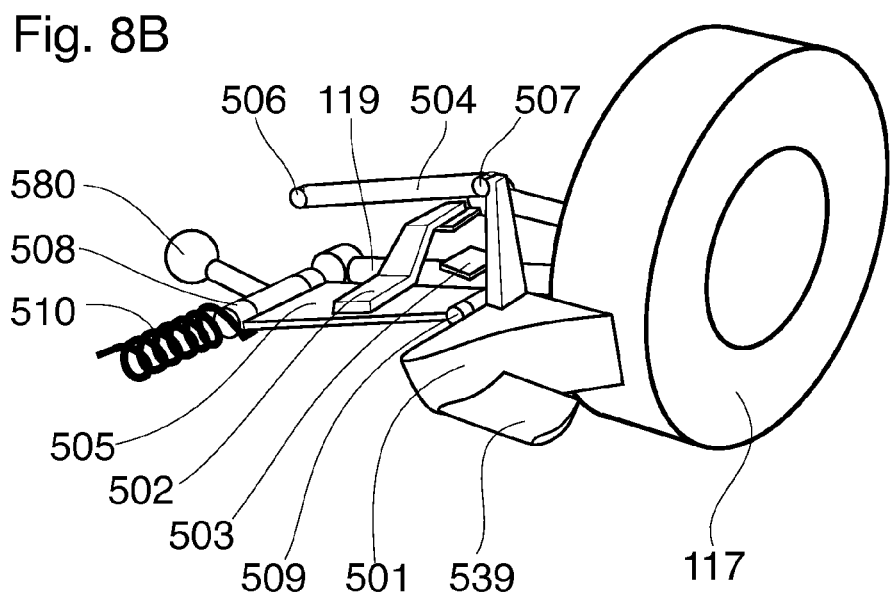

RETRACTABLE WHEEL FAIRINGS FOR MOTOR VEHICLES

CROSS-REFERENCE TO RELATED APPLICATIONS

Not Applicable

TECHNICAL FIELD

This application concerns motor vehicle aerodynamics and drag reduction, specifically reduction of the drag associated with a wheel by means of a retractable wheel fairing.

BACKGROUND

The wheels and wheel housings of a motor vehicle in travel are known to generate a significant amount of aerodynamic drag. Some of this drag is generated by the high pressure zone that builds up before a wheel of a motor vehicle in travel. This high pressure zone tends to force turbulent air to the sides of a wheel of a motor vehicle in travel, increasing aerodynamic drag and interfering with the flow of air under the motor vehicle resulting in a decrease in downforce. This high pressure zone before the wheel also results in an upward flow of turbulent air that enters the front of the wheel housing (wheel well), creating turbulence and high pressure in the wheel housing that results in increased aerodynamic drag and decreased downforce.

SUMMARY OF THE INVENTION

The present invention decreases the aerodynamic drag associated with a wheel and/or wheel housing of a motor vehicle in travel by use of a retractable and adaptive wheel fairing device that, among other effects, may smooth the flow of air around the wheel and/or over the wheel housing and may decrease the build up of high pressure air in front of the wheel during vehicle travel. The device may also be configured to reduce the volume of air in immediate contact with a rotating wheel to decrease aerodynamic drag. By decreasing aerodynamic drag in these ways, vehicle performance is improved, particularly in terms of improved gas mileage and decreased emissions. The wheel fairing device may also be configured to enhance brake cooling and to limit road material that is sprayed by a wheel of a vehicle in travel.

The wheel fairing device may be used in deployed and retracted modes. When deployed, the wheel fairing device is coupled to the suspension of the vehicle and moves with a vehicle wheel. When retracted, the wheel fairing device is held in an elevated, fixed position relative to the vehicle body and does not move with the vehicle wheel. The wheel fairing device may include aerodynamic elements that extend below the body of the vehicle to help smooth the flow of air around the exposed portion of the wheel. In deployed position the wheel fairing device may also be closely positioned around the perimeter of the wheel to help isolate the volume of air in direct contact with the rotating wheel, further decreasing aerodynamic drag.

The wheel fairing device, when deployed, physically engages with, and is supported by, the suspension of the vehicle so that the fairing body reciprocates with the associated vehicle wheel. By "reciprocate," I mean that as the vehicle traverses a roadway, the fairing body moves up and down simultaneously with the wheel such that the fairing body maintains a more constant distance above the roadway than maintained by the vehicle body. This prevents the wheel fairing device from coming into contact with the roadway, even when the wheel fairing device is very closely positioned to the roadway. Thus the wheel fairing device of the present invention may be made to very closely adapt to the roadway, allowing aerodynamic elements to be particularly effective in influencing and smoothing the airflow around the wheel and under the vehicle. This tends to decrease aerodynamic drag and increase downforce.

An exemplary suspension-mounted support system for the wheel fairing device includes a support bracket attached to the suspension connecting a wheel of the motor vehicle to the body of the motor vehicle. That support bracket supports an opposing support bracket that is connected to the wheel fairing device. The suspension-mounted support system for the wheel fairing device does not prevent an upward movement of the wheel fairing device relative to the suspension and wheel of the vehicle. This feature facilitates retraction of the wheel fairing device and means that the mass of the wheel fairing device is not fixedly attached to the suspension of the vehicle. Because of this feature, the wheel fairing device, even when deployed, does not add to the unsprung mass of the vehicle. The associated wheel is free to adapt to the roadway in a downward direction without being hindered by the mass of the wheel fairing device. This benefits vehicle handling. Additionally, because the wheel fairing device may move vertically without restriction, this system allows the wheel fairing device to be soft on impact with the roadway or objects thereon.

The wheel fairing device may be retracted and disengaged from the suspension of the vehicle by a retraction actuator and retraction linkage or set of retraction linkages that extend from the vehicle body to the wheel fairing device. The retraction actuator retracts the wheel fairing device by physically lifting the device from the suspension of the vehicle. When retracted, the wheel fairing device is held in a fixed position relative to the vehicle body and does not reciprocate with the associated wheel. This increases ground clearance which protects the wheel fairing device from damage in situations where greater ground clearance is necessary. The wheel fairing device may also be fully concealed in its retracted position so that the wheel fairing device does not detract from the visual appearance of the motor vehicle.

The path of motion of the fairing body as it reciprocates with the vehicle wheel and as it is retracted toward the body of the vehicle is determined by a guide linkage, or a pair or set of guide linkages that extend from the fairing body to the vehicle body. The guide linkages allow the fairing body to move vertically relative to the vehicle body and may be the same as the retraction linkage or linkages described above.

Embodiments of the wheel fairing device thus allow a road car or other type of motor vehicle to have a streamlined, low ground clearance mode with a deployed and reciprocating wheel fairing that does not add to the unsprung mass of the vehicle and is soft on impact with the roadway or objects thereon, and a less streamlined, high ground clearance mode with a retracted, fixed wheel fairing that may be completely concealed and is protected from damage.

Other advantages and novel features of the present invention are described in the following detailed description of the basic embodiment of the invention along with several additional embodiments.

BRIEF DESCRIPTION OF THE DRAWINGS

In the following discussion of the figures, any particular label which does not appear in a particular figure of immediate discussion is nevertheless present elsewhere in the figures. Accordingly, the figures should be considered as a whole.

FIG. 3A is a plan view of the basic embodiment of the present invention.

FIG. 3B is a plan view of the first additional embodiment of the present invention.

FIG. 3C is an anterior three-quarter view of the fairing body 101 of the basic embodiment isolated from other components.

FIG. 3D is an anterior three-quarter view of a fairing body 701 of an alternative embodiment isolated from other components.

FIG. 8A is a front three-quarter perspective view of the fourth additional embodiment of the present invention with the fairing body 501 in deployed position.

FIG. 8B is a front three-quarter perspective view of the fourth additional embodiment of the present invention (shown in FIG. 8A) with the fairing body 501 in retracted position.

DETAILED DESCRIPTION WITH REFERENCE TO THE DRAWINGS

Reference Numerals

Figure 1A:
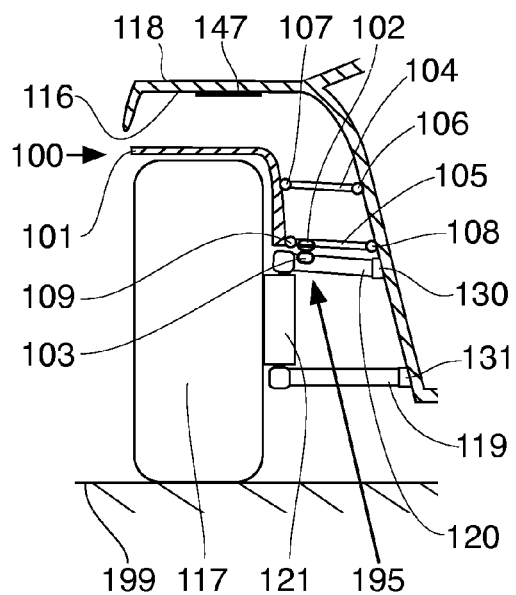
FIG. 1A is a rear cross-sectional view of the basic embodiment of the present invention with the fairing body 101 in deployed position. This view is in accordance with line 1-1 of FIG. 2A.

100 Wheel fairing device
101 Fairing body
102 Upper support bracket
103 Lower support bracket
104 Upper guide linkage
105 Lower guide linkage
106 Upper guide linkage basal hinge
107 Upper guide linkage apical hinge
108 Lower guide linkage basal hinge
109 Lower guide linkage apical hinge
110 Rotary retraction actuator
111 Retraction lever
112 Guide lever
113 Leading element
114 Trailing element
115 Motor
116 Wheel housing
117 Wheel
118 Vehicle body
119 Lower control arm
120 Upper control arm
121 Suspension upright
122 Refraction switch
123 Bearing surface of the upper support bracket
124 Bearing surface of the lower support bracket
125 Wheel fairing retraction control ECU
126 Leading element depression
127 Trailing element depression
128 Wheel pant
129 Coaxial torsion spring
130 Basal hinge of the upper control arm
131 Basal hinge of the lower control arm
132 Vehicle speed sensor
133 Refraction lever bearing
134 Wheel fairing retaining hook
135 Cushioning pad
136 Wheel fairing retaining latch spring
137 Wheel fairing retaining latch Bowden cable
138 Wheel fairing retaining latch cam
139 Dive plane
140 Cable return spring
143 Diffuser
146 Wheel fairing retaining latch
147 Refraction pad
150 Fairing body guide
155 Wheel fairing upward constraint
190 Wheel fairing retractor 195 Suspension-mounted support
198 Motor vehicle
199 Roadway
200 Wheel fairing device
201 Fairing body
202 Upper support bracket
203 Lower support bracket
204 Simple guide linkage
206 Simple guide linkage basal hinge
210 Rotary retraction actuator
211 Retraction lever
212 Guide lever
213 Leading element
222 Refraction switch
226 Free leading element depression
228 Wheel pant
229 Coaxial torsion spring
233 Refraction lever bearing
239 Dive plane
248 Cushioning pad
290 Wheel fairing retractor
300 Wheel fairing device
301 Fairing body
302 Upper support bracket
303 Lower support bracket
304 Front pantographic guide linkage
305 Rear pantographic guide linkage
310 Linear refraction actuator
313 Leading element
326 Leading element depression
328 Wheel pant
350 Fairing body guide
351 Retraction cable
352 Pulley
360 Upper plate
361 Lower plate
362 Inner folding support rod pair
363 Outer folding support rod pair
364 Support rod hinge
365 Support rod slider
390 Wheel fairing retractor
400 Wheel fairing device
401 Fairing body
404 Simple guide linkage
426 Simple wheel fairing depression
440 Support linkage
441 Support linkage upper mounting bracket
442 Support linkage lower mounting bracket
495 Suspension-mounted support
500 Wheel fairing device
501 Fairing body
504 Upper guide linkage
505 Lower guide linkage
506 Upper guide linkage basal hinge
507 Upper guide linkage apical hinge
508 Lower guide linkage basal hinge
509 Lower guide linkage apical hinge
510 Refraction spring
539 Dive plane
580 Refraction counter weight
590 Wheel fairing retractor
600 Wheel fairing device
601 Fairing body
604 Pantographic guide linkage
670 Fairing body position actuator
671 Suspension position sensor
672 Support linkage
673 Fairing body height ECU
701 Fairing body
728 Wheel pant 750 Leading element intake
FIGS. 1A, 1B, 2A, 2B, 2C, 3A, 3C, 4A, 4B, 10A, 10B.

What I call herein (for convenience of description) the basic embodiment of the present invention, includes a fairing body 101 (FIG. 1A) within a wheel housing 116 of a wheeled vehicle 198 (FIG. 2A) that includes a motor 115. The fairing body 101 (FIG. 3C) is adapted to smooth the flow of air around a wheel 117 that is connected to the vehicle body 118 through a suspension system including, in this example, a lower control arm 119, upper control arm 120, and suspension upright 121. The upper control arm 120 is pivotably attached to the vehicle body 118 through the upper control arm basal hinge 130, and the lower control arm is pivotably attached to the vehicle body 118 through the lower control arm basal hinge 131.

As will be apparent to a reader skilled in this technology, some conventional suspension components of the vehicle, including springs, dampers, toe links, steering arms, and driveshafts, are present but not shown, for clarity of depiction. A vehicle with double wishbone suspension system is shown throughout this disclosure, but it is in accordance with the present invention to mount a device of the present invention to vehicles fitted with other types of suspension system, including, for example, McPherson/Chapman strut suspension systems, trailing arm suspensions, multilink suspensions, and solid axle suspension systems.

A non-steered wheel is shown throughout this disclosure, but it is in accordance with the present invention to fit the wheel fairing device of the present invention to a steered wheel of a motor vehicle. When the wheel fairing device is to be fitted to a steered wheel, the wheel fairing device would, of course, be configured to accommodate the range of steering motion of the steered wheel. An alternative embodiment in accordance with the present invention would be to adapt the fairing body to rotate about a vertical axis to follow the steering motions of a steered wheel.

Throughout this disclosure, the device is shown fitted to the left rear wheel of a four-wheeled motor vehicle, but it is to be understood that the device would also be fitted to the opposite wheel. Optionally the device would be fitted to one or both front wheels or to all wheels of a four-wheeled vehicle. Such a device may also be fitted to the wheels of vehicles with more than four wheels, including trucks, and to vehicles with closely mounted, paired wheels.

For purposes of this disclosure, the vehicle body 118 includes all of the fully-sprung components of the vehicle that are isolated from the movements of the vehicle wheels and end of the suspension by the shock-damping system of the vehicle's suspension system. This includes the chassis of a vehicle. Unsprung components of a motor vehicle include the wheels and parts of the suspension system that closely and permanently reciprocate with the wheels, such as the suspension upright 121. For purposes of this disclosure, "suspension system" refers to those components of the vehicle that connect a wheel 117 to the fully-sprung vehicle body 118 and that permit relative vertical displacement of a wheel 117 relative to the vehicle body 118.

Figure 1B:
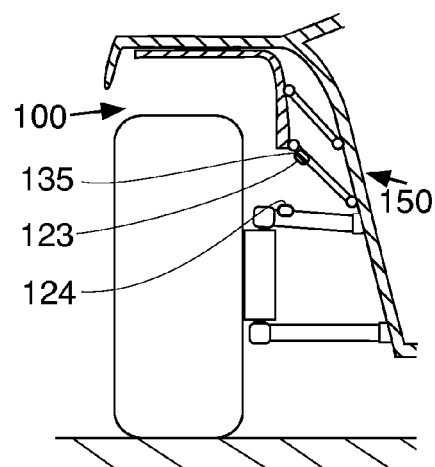
FIG. 1B is a rear cross-sectional view of the basic embodiment of the present invention with the fairing body 101 in retracted position. This view is in accordance with line 1-1 of FIG. 2A.
Figure 2A:
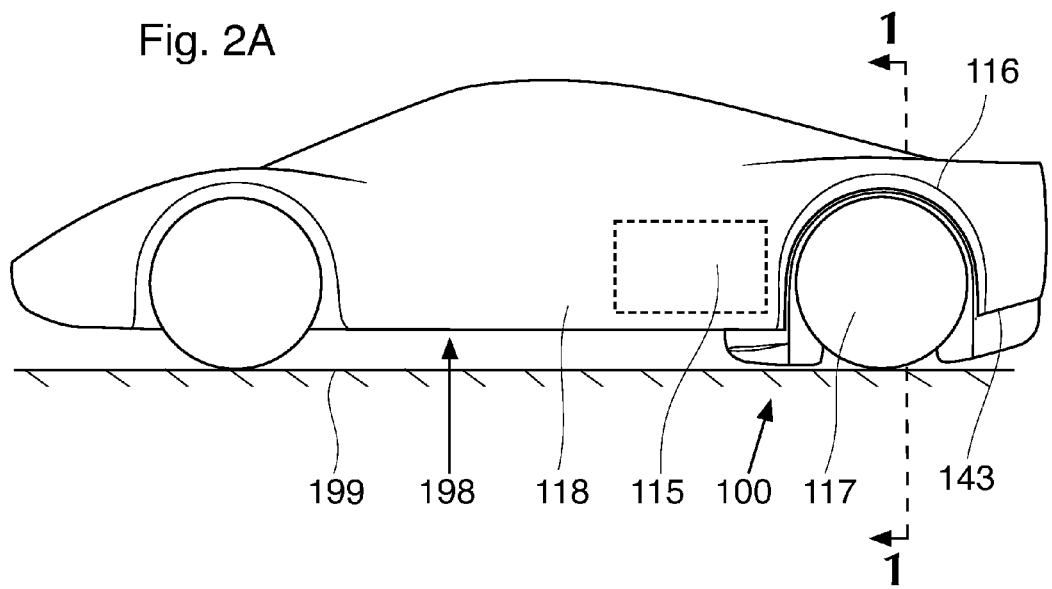
FIG. 2A is a left side elevation view of a motor vehicle with a wheel fairing device of the basic embodiment adapted to the left rear wheel of the vehicle.

FIG. 1A and FIG. 1B are rear cross-sectional views of the basic embodiment in deployed (FIG. 1A) and retracted (FIG. 1B) positions taken along line 1-1 of FIG. 2A. For simplicity of illustration, in FIG. 1A and FIG. 1B, the wheel 117 is shown in outline rather than cross-section. The same convention is maintained in FIG. 6C, depicting an additional embodiment of the present invention.

Figure 2B:
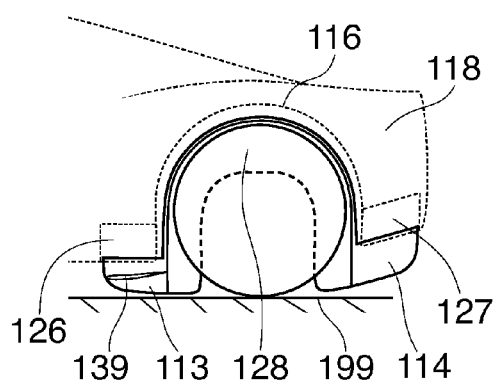
FIG. 2B is a left side elevation view of the basic embodiment of the present invention with the wheel fairing device in deployed position.
Figure 2C:
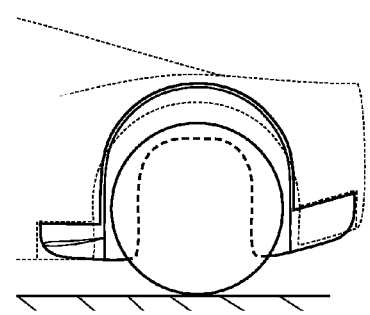
FIG. 2C is a left side elevation view of the basic embodiment of the present invention with the wheel fairing device in retracted position.

FIG. 2B is a left side elevation view of the basic embodiment in deployed position within a left wheel housing 116 of the vehicle. FIG. 2C is the same in retracted position. FIG. 3A is a plan view of the wheel fairing device 100 showing the position of the fairing body 101 relative to a left wheel 117 and suspension of the vehicle.

Figure 4A:
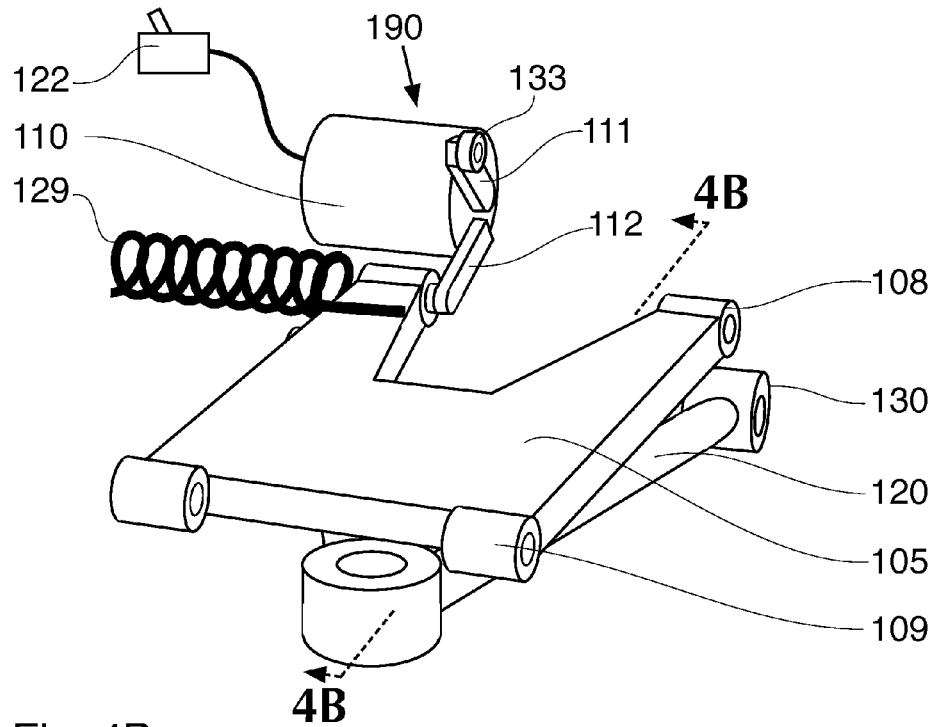
FIG. 4A is a three-quarter view from above of the left rear of the lower guide linkage 105 and rotary retraction actuator 110 of a wheel fairing device of the basic embodiment for a left rear wheel of a motor vehicle.
Figure 4B:
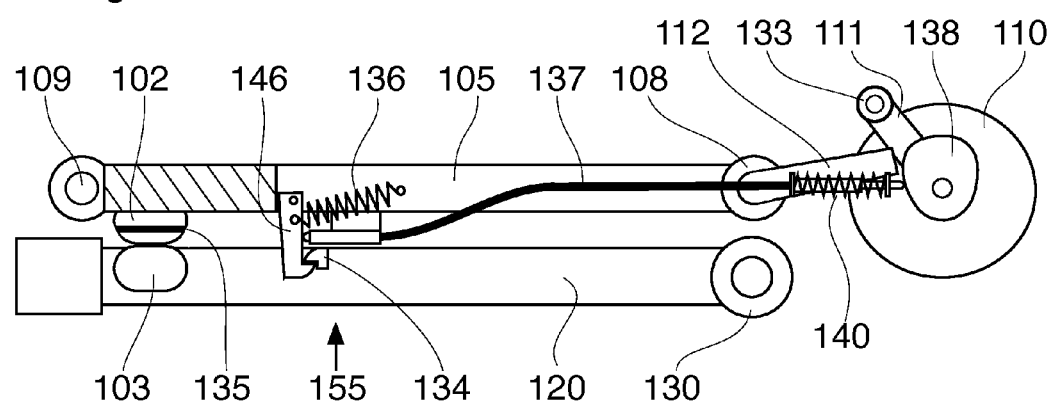
FIG. 4B is a rear cross-sectional view of the wheel fairing upward constraint 155. This view is in accordance with line 4B-4B of FIG. 4A.

As shown in FIG. 1A, the fairing body 101 is connected to the vehicle body 118 through a pair of parallel guide linkages, the upper guide linkage 104 and lower guide linkage 105. FIG. 4A is a perspective rear three quarter view from above of the lower guide linkage 105. The upper guide linkage 104 and lower guide linkage 105 may be made of any sufficiently rigid, preferably light material, such as aluminum, glass reinforced plastic, or carbon fiber composite. Other materials may also be suitable. Other embodiments of guide linkages are disclosed herein and may be used instead.

The lower guide linkage 105 is pivotably attached to the vehicle body 118 through a lower guide linkage basal hinge 108 that is situated, in this embodiment, immediately above the vehicle suspension. Similarly, the upper guide linkage 104 is pivotably attached to the vehicle body 118 through an upper guide linkage basal hinge 106 situated above the lower guide linkage basal hinge 108.

As shown in FIG. 4A, the base of the lower guide linkage 105 and lower guide linkage basal hinge 108 are divided. This provides space, in this example embodiment, for components of the suspension, such as a shock damper unit. The axes of rotation of both the upper guide linkage basal hinge 106 and the lower guide linkage basal hinge 108 are oriented longitudinally. Other shapes of guide linkages may also be used in accordance with the present invention. Depending upon how the device is fitted to the vehicle, the lower guide linkage 105 and/or upper guide linkage 104 may be situated at other positions relative to the suspension of the vehicle (see other examples among the additional embodiments). Alternatively, the guide linkages may be pivotably attached to the base of the suspension of the vehicle or to a combination of the base of the suspension of the vehicle and the vehicle body 118.

The upper guide linkage 104 is pivotably attached to the fairing body 101 through the upper guide linkage apical hinge 107. Similarly, the lower guide linkage 105 is pivotably attached to the fairing body 101 through the lower guide linkage apical hinge 109. The axis of rotation of the upper guide linkage apical hinge 107 and the axis of rotation of the lower guide linkage apical hinge 109 are both longitudinally oriented. By use of two guide linkages, the orientation of the fairing body 101 may be maintained and controlled throughout its range of motion, much as the camber of a wheel may be maintained and controlled by a pair of control arms in a motor vehicle with double wishbone suspension.

The wheel fairing device 100 of the present invention (FIG. 3A) is an assembly comprising all of the structures of the device, including the fairing body 101, upper guide linkage 104, lower guide linkage 105, upper support bracket 102, lower support bracket 103, and wheel fairing retractor 190.

The wheel fairing device 100 is supported upon the upper control arm 120 of the suspension by an upper support bracket 102 mounted on the lower guide linkage 105 that presses upon a lower support bracket 103 mounted on the upper control arm 120 of the suspension. The lower end of the upper support bracket 102 is produced into a smooth and rounded bearing surface of the upper support bracket 123 that opposes a corresponding and similarly shaped bearing surface of the lower support bracket 124.

The upper support bracket 102 and lower support bracket 103 may be situated at other positions on the wheel fairing device 100 and vehicle suspension, provided the fairing body 101 is made to reciprocate sufficiently well with the wheel 117 during vehicle travel.

In alternative embodiments of the invention, upper support bracket 102 and lower support bracket 103 may be omitted, provided that a part of the suspension of the vehicle supports a part of the wheel fairing device 100 when the fairing body 101 is deployed. Depending upon the relative positions of the lower guide linkage 105 and upper control arm 120, the opposing surfaces of the upper support bracket 102 and lower support bracket 103 may need to be able to slide against one another. In that event, it would therefore be useful to have these opposing surfaces rounded and smooth. The interface between the upper support bracket 102 and lower support bracket 103 may also be lubricated to assist sliding between these two components. The foregoing is one example of what is herein referred to as a "suspension-mounted support" for a wheel fairing device 100 of my invention. The upper support bracket 102 and lower support bracket 103 comprise the suspension-mounted support 195 of the basic embodiment.

When adapting the retractable wheel fairing device to vehicles with suspension types other than the double wishbone system shown in the basic embodiment, a suitable position for the upper support bracket 102 on the wheel fairing device and a suitable position for the lower support bracket 103 on the suspension system must be chosen. Positions for these components should be chosen that cause the fairing body 101 to reciprocate sufficiently well with the vehicle wheel 117 when the fairing body 101 is deployed during vehicle travel. The upper support bracket 102 and lower support bracket 103 should be constructed of suitably strong and durable material, such as chromoly steel. Other materials may be used instead.

The lower guide linkage 105 is connected at its base with the guide lever 112 (FIG. 4A). The axis of rotation of the guide lever 112 is defined by the lower guide linkage basal hinge 108 and is longitudinally oriented. The guide lever 112 is rotated by the refraction lever 111 that is fitted with the retraction lever bearing 133 at its apex. The retraction lever 111 is connected to and rotated by the rotary retraction actuator 110 that is situated in the vehicle body 118. The rotary retraction actuator 110 may be operated by the driver of the vehicle through a driver-operable retraction switch 122 (FIG. 4A). Alternatively or additionally, automatic control means responsive to sensor means may be used to actuate the rotary retraction actuator 110. The rotary retraction actuator 110 rotates the retraction lever 111 downward until the retraction lever bearing 133 engages with the guide lever 112, causing the guide lever 112 to be rotated downward, thus rotating the lower guide linkage 105 upward. The upward rotation of the lower guide linkage 105 simultaneously lifts the fairing body 101 and disengages the device from the suspension so that the fairing body 101 does not reciprocate with the vehicle wheel 117 when the fairing body 101 is retracted.

The rotary retraction actuator 110 may be electric or of other types. In this basic embodiment, the guide lever 112, retraction lever 111, retraction lever bearing 133, and rotary retraction actuator 110 comprise an exemplary "wheel fairing refractor" 190. This is just one example of a wheel fairing retractor. Other example embodiments of the wheel fairing retractor are possible and may be used instead. The wheel fairing retractor 190 may also be omitted in which case the fairing body 101 is non-retractable.

When not engaged with the rotary retraction actuator 110, the lower guide linkage is rotated downward at its base by a coaxial torsion spring 129 (FIG. 4A). Other means may be provided to rotate the lower guide linkage 105 downward and thus move the fairing body 101 into its deployed position and pressed against the suspension of the vehicle. The mass of the device and force of gravity may be sufficient on its own to rapidly move the fairing body 101 into its deployed position and to keep it fully deployed so that the coaxial torsion spring 129 may be omitted. An aerodynamic structure or structures may also serve to help deploy the wheel fairing device and help keep the wheel fairing device 100 in fully deployed position (see below).

As shown in FIG. 2B, the front portion of the fairing body 101 is produced into a leading element 113 that is accommodated, in the retracted position, by a leading element depression 126 that is continuous with and before the wheel housing 116 on the undersurface of the vehicle body 118. The leading element 113 bears a dive plane 139 that provides an amount of downforce that helps to keep the wheel fairing in its fully deployed position during vehicle travel. A larger wing may additionally or alternatively be included on the fairing body 101 for greater downforce generation and improved tire grip. In addition to generating a downward force, the dive plane 139 may generate a vortex of air at the base of the wheel 117 that may help smooth the flow of air around the wheel 117. The leading element 113, as well as other components of the fairing body 101, may also bear a skirt or brush at its lower edge that is designed to contact the roadway 199 during vehicle travel for improved aerodynamic performance. It is also possible to incorporate folding elements or portions that change shape on the fairing body 101 so that the fairing body 101 may fit more compactly against the vehicle body 118 when refracted within the wheel housing 116. It is also possible to include other aerodynamic elements on the fairing body 101 that may produce useful effects such as more direct downforce or improved functioning of the vehicle diffuser 143 or underbody venturi tunnels.

The rear of the fairing body 101 is produced into a smoothly curved trailing element 114 that is accommodated, when the device is refracted, by a trailing element depression 127 that is continuous with and behind the wheel housing 116 on the undersurface of the vehicle body 118.

Between the leading element 113 and trailing element 114 is the wheel pant 128. The wheel pant 128 is shaped to closely fit and accommodate the wheel 117 and components of the suspension throughout the range of motion of the wheel fairing device 100 and the range of motion of the suspension of the vehicle. By decreasing the volume of turbulent air around the rotating wheel 117 of a motor vehicle in travel, the wheel pant 128 may decrease the aerodynamic drag of the vehicle. Although not shown in this disclosure, the wheel pant 128 may include an outer face to partially enclose the outer side of the wheel 117 for improved aerodynamic effect. Such an outer face of the wheel pant may be made removable. The wheel pant 128 may also be configured with appropriately positioned and shaped orifices and/or ducting to enhance brake cooling (see below). Because in its deployed position the wheel pant 128 may closely conform to the wheel, it may also help to limit the amount of roadway material that is picked up and ejected by a wheel 117 of a vehicle in travel. Such material may include water, mud, dust, stones, and other matter that may cover the surface of a roadway. In this disclosure, any material that is picked up by a wheel 117 of a vehicle in travel and ejected away from the wheel 117 is termed "wheel spray". Other components of the fairing body 101, including the trailing element 114 and leading element 113 may also help to reduce wheel spray.

The leading element 113, trailing element 114, and wheel pant 128, comprise the fairing body 101 which may be constructed as one continuous structure or as separate parts. The fairing body 101 may be constructed, for example, of plastic, glass reinforced plastic, carbon fiber laminate, aluminum, or other appropriate materials or combination of materials that are preferably both light and strong. Examples of other embodiments of the fairing body 101 are disclosed herein and may be used instead.

Both the leading element 113 and trailing element 114 are shaped to smooth the airflow around the wheel 117 and help decrease aerodynamic drag generated by the wheel 117. In particular, the leading element 113 tends to decrease the high pressure zone just before the base of the wheel 117. By decreasing the high pressure zone just before the base of the wheel 117, the amount of turbulent air that emerges to the sides of the wheel 117 (so-called "tire squirt") is decreased, resulting in a decrease in aerodynamic drag and an increase in the velocity of airflow underneath the vehicle which tends to increase downforce. Additionally, the amount of turbulent air that is forced upward into the wheel housing 116 is decreased, resulting in less turbulent airflow in the wheel housing 116 and less aerodynamic drag. The leading element 113 and trailing element 114 may be of various shapes including of a simple flat skirt form. In other embodiments, the leading element may include a forwardly directed intake and ducting to redirect high pressure air to other locations. Such a leading element intake 750 is shown in FIG. 3D of a fairing body 701 adapted to enhance brake cooling. In this example the leading element intake 750 is continuous with ducting that leads to an air exit on the wheel pant 728. This arrangement directs cooling air to a vehicle brake.

Besides its effect on aerodynamic drag, the trailing element 114 may also improve the functioning of the diffuser 143 at the rear of the motor vehicle (or the functioning of a front diffuser if the wheel fairing device 100 is mounted to a front wheel) by limiting the inflow of air from the side of the diffuser 143. This may increase the speed of airflow below the vehicle and thus increase downforce generation.

The upper support bracket 102 includes a thin cushioning pad 135 of rubber below the bearing surface of the upper support bracket 123 to cushion the movements between the vehicle suspension and the lower guide linkage 105. There are many other ways that such cushioning may be provided, such as a spring or a small spring and damper unit incorporated into the upper support bracket 102 or lower support bracket 103. Such cushioning may also be omitted. A retraction pad 147 is situated on the upper surface of the wheel housing 116 to help cushion contact between the fairing body 101 and wheel housing 116 when the fairing body 101 is retracted. The retraction pad 147 may also be omitted.

Operation.

In its deployed position, as shown in rear cross-sectional view in FIG. 1A, the fairing body 101 is supported by the physical contact between the upper support bracket 102 and the lower support bracket 103. In this way, the fairing body 101 in its deployed position maintains a substantially constant positional relationship with respect to the roadway 199, regardless of changes in height and orientation of the vehicle body 118 above the roadway that occur during vehicle travel. It is also possible to use more than one upper support bracket 102 and one lower support bracket 103 to support the fairing body 101 from the suspension of the vehicle. Throughout this disclosure, when the wheel fairing device 100 is supported by the suspension of the vehicle to reciprocate with the associated wheel, the wheel fairing device 100 is described as "engaged" with the suspension. When the wheel fairing device 100 is retracted and not supported by the suspension of the vehicle, the wheel fairing device 100 is described as "disengaged" from the suspension.

The fairing body 101 is retracted by activation of the rotary retraction actuator 110. When activated, the rotary retraction actuator 110 rotates the retraction lever 111 downward which rotates the guide lever 112 downward. This rotates the lower guide linkage 105 upward which causes the fairing body 101 to move upward, away from the wheel 117 and toward the vehicle body 118 where the fairing body 101 may securely rest against the retraction pad 147. When in the retracted position, the fairing body 101 is disengaged from the suspension and no longer moves with the suspension. Instead, in the retracted position, as shown in rear cross-sectional view in FIG. 1B, it is fixed against the inside of the wheel housing 116 by tension imparted by the rotary retraction actuator 110, by opposing pressure exerted by the retraction pad 147, and by the upper guide linkage 104 and lower guide linkage 105 that fix its horizontal position. The wheel fairing device 100 may also be held in its retracted position by a remotely operated latch or other means, including an electromagnet.

The ability to retract the fairing body 101 allows ground clearance to be raised when the characteristics of the roadway 199 do not allow for the passage of a low-ground-clearance vehicle or when the vehicle is travelling at lower speeds and in which streamlining of the vehicle is less important. If a wheel fairing retractor 190 is not included, the fairing body 101 would be permanently deployed. An embodiment of my present invention without a wheel fairing retractor 190 would still have the advantage that the wheel fairing device 100 is not fixedly attached to the suspension of the vehicle and so does not add to the unsprung mass of the vehicle. Also, such a wheel fairing device 100 would still be compliant upon impact with the roadway or objects thereon.

As an alternative embodiment, it is also contemplated to include a structure or structures to constrain in the upward direction (herein termed a "wheel fairing upward constraint") the deployed fairing body 101 so that fairing body 101 would not separate, or at least would not readily separate, away from the wheel 117 during vehicle travel. By "separate", I mean increase in distance between the fairing body 101 and the wheel 117. Such a wheel fairing upward constraint 155, for example, may be by use of a wheel fairing retaining latch 146 (FIG. 4B) that is attached to the lower guide linkage 105 that engages with a corresponding wheel fairing retaining hook 134 attached to the upper control arm 120. The wheel fairing retaining latch 146 is pivotably attached to the lower guide linkage 105 and held in a closed position by the wheel fairing retaining latch spring 136. Upon deployment, the wheel fairing retaining latch 146 will automatically open when it engages the wheel fairing retaining hook 134.

The wheel fairing retaining latch 146 is disengaged from the wheel fairing retaining hook 134 by the initial actuation of the rotary retraction actuator 110. The latch is opened by a pushing force imparted by the wheel fairing retaining latch Bowden cable 137 whose opposite end is pushed by the wheel fairing retaining latch cam 138 positioned adjacent to the retraction lever 111. When the rotary retraction actuator 110 is actuated, the wheel fairing retaining latch cam 138 is turned which, in consequence, depresses the end of the wheel fairing retaining latch Bowden cable 137, which in turn opens the wheel fairing retaining latch 146. This allows the fairing body 101 to be retracted upon further actuation of the rotary retraction actuator 110. The basal end of the Bowden cable 137 is held against the wheel-fairing retaining latch cam 138 by the cable return spring 140.

The following are other kinds of wheel fairing upward constraint that I contemplate can be used to temporarily constrain the upward movement of the fairing body 101 from the suspension of the vehicle, including, for example, opposing Velcro strips mounted on the opposing faces of the upper support bracket 102 and lower support bracket 103, attracting magnets mounted on the opposing faces of the upper support bracket 102 and lower support bracket 103, or an electromagnet mounted on the upper support bracket 102 and adapted to attract the lower support bracket 103 when activated by an electric current. These are merely examples of types of wheel fairing upward constraint. Other mechanisms may alternatively be employed for this purpose. In other embodiments of my present invention, such wheel fairing upward constraints may be omitted, such as in the basic embodiment and the other embodiments disclosed herein.

One who implements my present invention should consider that a consequence of using a wheel fairing upward constraint 155 is that the mass of the wheel fairing device 100 adds to the unsprung mass of the vehicle. A further consequence of using such a wheel fairing upward constraint 155 is that the fairing body 101 may not be compliant upon impact with the roadway 199 or objects thereon.

Deployment of the fairing body 101 is accomplished by reversing the rotary retraction actuator 110, thereby rotating the refraction lever 111 upward and thus rotating the guide lever 112 upward. This causes the lower guide linkage 105 to rotate downward and thus to move the fairing body 101 toward the wheel 117. The rotary refraction actuator 110 rotates far enough so that the retraction lever bearing 133 disengages with the guide lever 112 so that the vertical movements of the fairing body 101 are unconstrained when the wheel fairing device 100 is deployed. Deployment of the wheel fairing device 100 is facilitated by the force of gravity and by the downward torque on the lower guide linkage 105 imparted by the coaxial torsion spring 129 at its base. Other types of spring may be used for this purpose. The dive plane 139 on the leading element 113 may also impart an aerodynamic downward force on the fairing body 101. As a result of this downward movement, the lower guide linkage 105 comes to be supported on the upper control arm 120 of the suspension through contact between the upper support bracket 102 and lower support bracket 103. This functionally engages the wheel fairing device 100 with the suspension system so that the fairing body 101 reciprocates with the vehicle wheel 117.

Because the wheel fairing device 100 is not fixed to the suspension, the mass of the wheel fairing device 100 is not fixed to the unsprung mass of the vehicle. This benefits vehicle handling because it allows the suspension to more rapidly adjust to irregularities in the roadway 199. This arrangement also makes the fairing body 101 compliant upon impact with the roadway 199 or objects thereon.

The upper guide linkage 104 and lower guide linkage 105 serve to limit the fairing body 101 to a single path of movement and to follow the path of movement and orientation of the vehicle wheel 117. For any given vertical position, the upper guide linkage 104 and lower guide linkage 105 fix the fairing body 101 in terms of its longitudinal position, lateral position, and orientation relative to the vehicle body 118.

Other arrangements of guide linkages may be used in accordance with the present invention, including arrangements including additional guide linkages that help stabilize the movement of the fairing body 101. Guide linkages may also be linked to the fairing body 101 or vehicle body 118 through ball joints in various multilink arrangements. Depending upon how the guide linkages are arranged, the extra freedom of movement that is enabled by ball joints, for example, may allow the fairing body 101 to change orientation as it is retracted into the wheel housing 116. This may be done for various reasons, including allowing the fairing body 101 to better fit within the wheel housing 116.

As exemplified in the additional embodiments of the present invention, there are other mechanisms that may be used to constrain the path of movement of the fairing body 101 while allowing the fairing body 101 to move vertically. In this disclosure, any structure or assembly of structures that serves to constrain and determine the path of movement of a fairing body 101 while allowing the fairing body 101 to move vertically is referred to as a "fairing body guide". The upper guide linkage 104 and lower guide linkage 105 comprise the fairing body guide 150 of the basic embodiment.

A structure or structures may be provided to limit the downward extension of the fairing body 101 so that it does not follow the full travel of the wheel 117. For example, the fairing body 101 may be designed to follow the movement of the wheel 117 only at the upper range of suspension compression. This is easily accomplished, for example, by the inclusion of a body-mounted support bracket designed to support the lower guide linkage 105 at the lower end of the travel of the lower guide linkage 105.

The wheel fairing retractor 190 may be operated through use of a driver-operable retraction switch 122. Alternatively or additionally, a wheel fairing retraction control ECU (electronic control unit) 125 (FIG. 10A) may be provided that may actuate the wheel fairing retractor 190 automatically based upon sensor or other processor input. For example, such an automatic wheel fairing refraction control ECU 125 could be made responsive to a vehicle speed sensor 132 and to actuate the wheel fairing retractor 190 based upon vehicle speed. For example, the wheel fairing retraction control ECU 125 may deploy the wheel fairing device 100 at or above a vehicle speed threshold of 70 km/h. To prevent continued alternate deployment and retraction of the device around that vehicle speed threshold, the wheel fairing refraction control ECU 125 may be programmed to retract the wheel fairing device 100 only when vehicle speed falls to or below a threshold value well below the deployment threshold. In this example, a retraction speed threshold of 60 km/h may prevent a state of continued rapid deployment and refraction of the wheel fairing device 100.

Figure 10A:
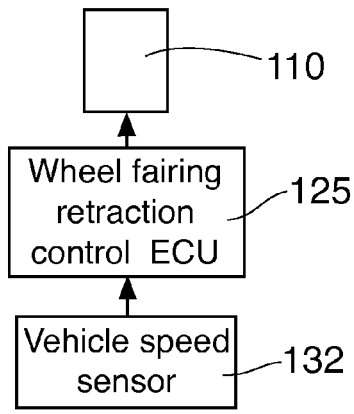
FIG. 10A is a block diagram of an automatic wheel fairing refraction control system in accordance with my invention.
Figure 10B:
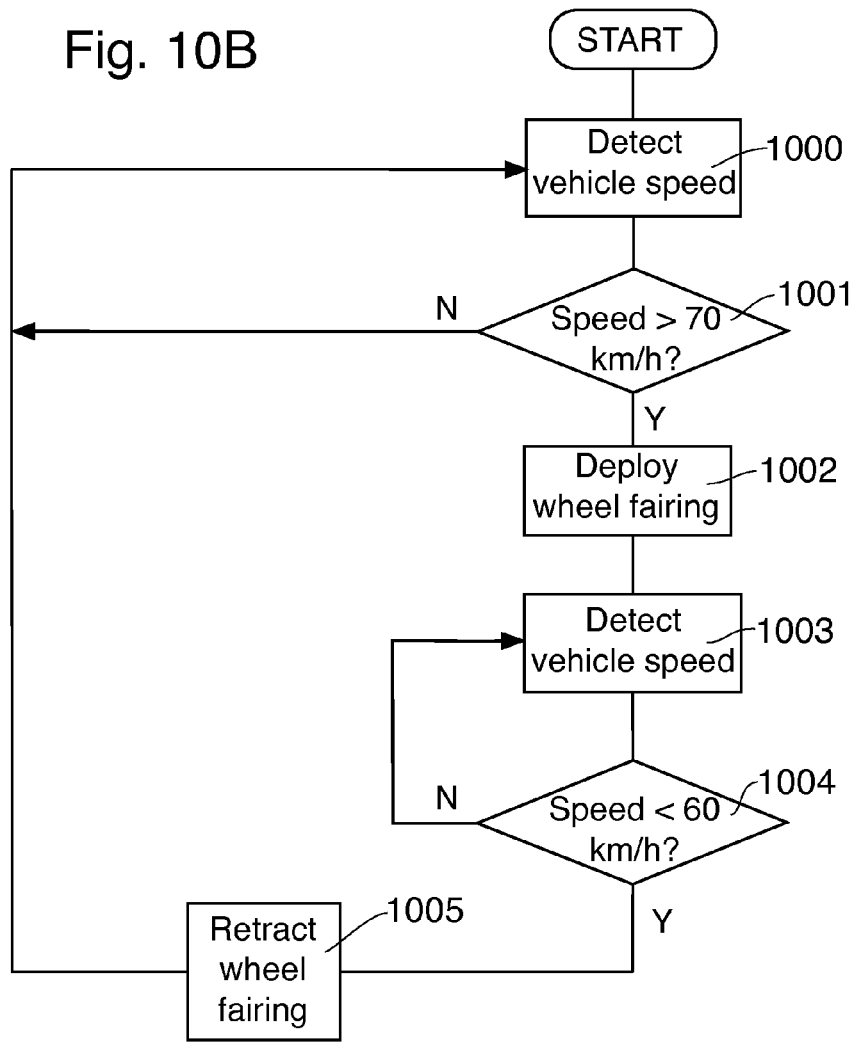
FIG. 10B is a flowchart for a wheel fairing retraction ECU in accordance with my invention.

FIG. 10B is a flowchart for a wheel fairing retraction control ECU system that will produce the desired output described immediately above.

In Step 1000 the vehicle speed is detected from output generated by the vehicle speed sensor 132. The process then proceeds to Step 1001.

In Step 1001 the vehicle speed determined in Step 1000 is compared to the stored value of 70 km/h. If the vehicle speed is greater than or equal to 70 km/h, the process proceeds to Step 1002, otherwise the process proceeds to Step 1000.

In Step 1002 the wheel fairing device 100 is deployed by appropriate output to the retraction actuator 110. The process then proceeds to Step 1003.

In Step 1003 the vehicle speed is detected from output generated by the vehicle speed sensor 132. The process then proceeds to Step 1004.

In Step 1004 the vehicle speed determined in Step 1003 is compared to the stored value of 60 km/h. If the vehicle speed is less than or equal to 60 km/h, the process proceeds to Step 1005, otherwise the process proceeds to Step 1003.

In Step 1005 the wheel fairing device 100 is retracted by appropriate output to the retraction actuator 110. The process then proceeds to Step 1000.

First Additional Embodiment

FIGS. 3B, 5A, 5B

Figure 5A:
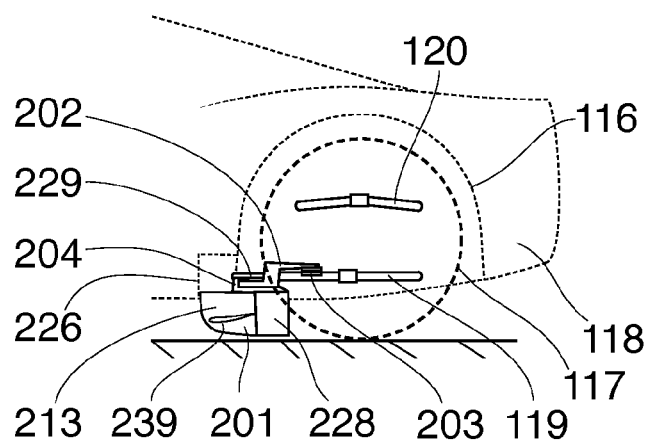
FIG. 5A is a left side elevation view of the first additional embodiment of the present invention (shown in FIG. 3B) with the fairing body 201 in deployed position.
Figure 5B:
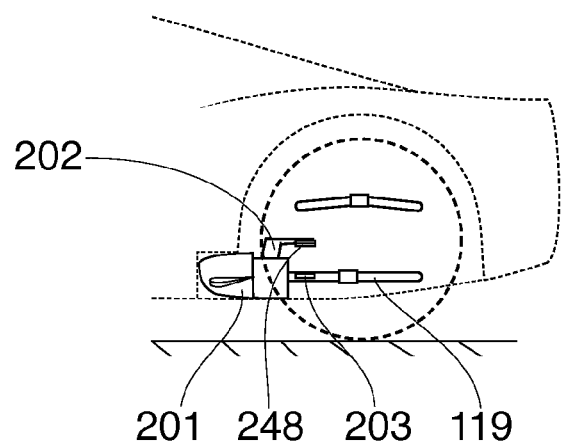
FIG. 5B is a left side elevation view of the first additional embodiment of the present invention (shown in FIGS. 3B and 5A) with the fairing body 201 in retracted position.

FIG. 3B is a plan view of a first additional embodiment of a wheel fairing device 200 in accordance with the present invention. FIG. 5A is a left side elevation view of the first additional embodiment in accordance with the present invention with a fairing body 201 in deployed position. FIG. 5B is the corresponding view of the same embodiment with the fairing body 201 in retracted position.

This first additional embodiment is structurally and operationally the same as the basic embodiment described above, with some exceptions. These exceptions are that the fairing body 201 consists largely of a leading element 213 before the vehicle wheel 117. The fairing body 201 of this first additional embodiment does not include a trailing element, and the wheel pant 228 is represented by a short length of skirt continuous with the medial rear edge of the leading element 213.

The leading element 213 bears a dive plane 239 and is accommodated by a leading element depression 226 when the wheel fairing is retracted. The fairing body 201 is connected with the vehicle body 118 through a simple guide linkage 204 that is fixedly attached to the fairing body 201 and is of a relatively wide shape. The simple guide linkage 204 is pivotably attached to the vehicle body 118 through a simple guide linkage basal hinge 206. The simple guide linkage basal hinge 206 is coaxial with the axis of rotation of the basal hinge of the lower control arm 131.

The simple guide linkage 204 bears an upper support bracket 202 that is positioned at the rear of the simple guide linkage 204 and designed to oppose a lower support bracket 203 mounted to the upper surface of the front edge of the lower control arm 119 of the suspension. Because the simple guide linkage basal hinge 206 and basal hinge of the lower control arm 131 are coaxial, the upper support bracket 202 and lower support bracket 203 do not substantially move relative to one another as the suspension moves.

A cushioning pad 248 is situated on the upper support bracket 202. The cushioning pad may be situated alternatively on the lower support bracket 203 to cushion contact between the suspension and the wheel fairing device 200. The wheel fairing retractor 290 of this first additional embodiment is the same as that described for the basic embodiment and includes a rotary retraction actuator 210 operable by a driver-operated retraction switch 222, retraction lever 211, retraction lever bearing 233, and guide lever 212. The wheel fairing device 200 also includes a coaxial torsion spring 229 that helps to keep the wheel fairing device 200 fully deployed and pressed against the lower control arm 119 when the wheel fairing device 200 is deployed.

The simple fairing body 201 is designed to smooth the flow of air around the front of the vehicle wheel 117 to decrease aerodynamic drag. It is possible to expand the simple guide linkage 204 to cover a part of the lower, horizontal portion of the wheel housing 116 when the wheel fairing device 200 is deployed to streamline the flow of air over this lower portion of the wheel housing 116 and across the lower control arm 119 of the suspension, decreasing aerodynamic drag and increasing downforce.

Second Additional Embodiment

FIGS. 6A, 6B, 6C, 6D

Figure 6A:
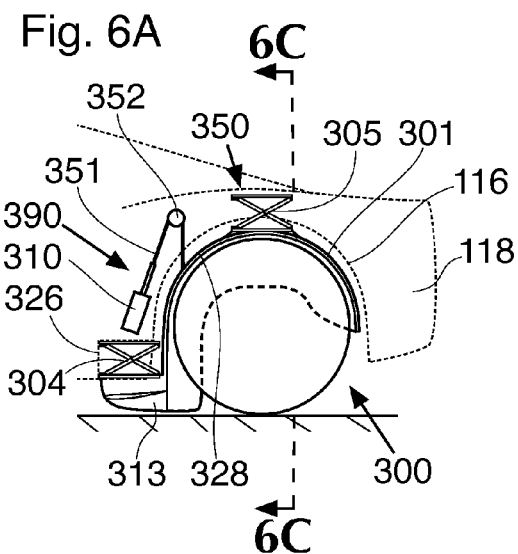
FIG. 6A is a left side elevation view of the second additional embodiment of the present invention with the fairing body 301 in deployed position.
Figure 6B:
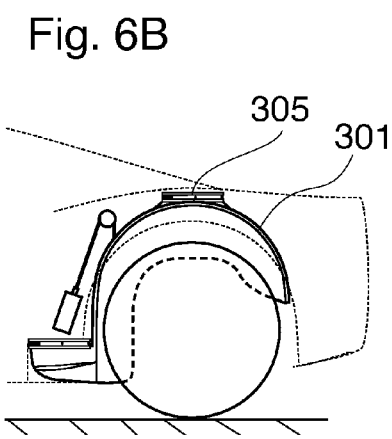
FIG. 6B is a left side elevation view of the second additional embodiment of the present invention (shown in FIG. 6A) with the fairing body 301 in refracted position.
Figure 6C:
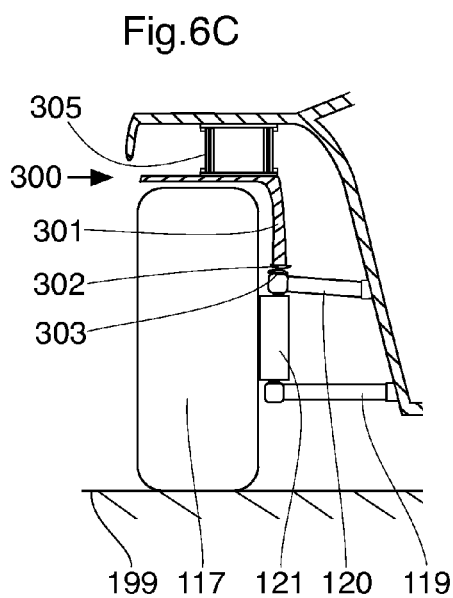
FIG. 6C is a rear cross-sectional view of the second additional embodiment of the present invention (shown in FIGS. 6A and 6B) with the fairing body 301 in deployed position. This view is in accordance with line 6C-6C of FIG. 6A.
Figure 6D:
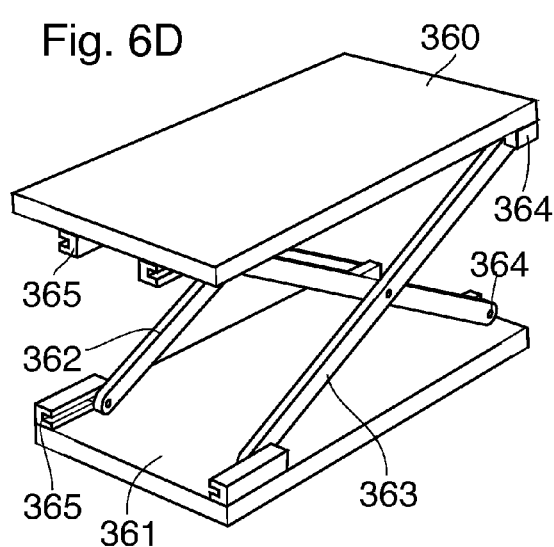
FIG. 6D is a perspective front three-quarter view of a pantographic guide linkage 304 of the second additional embodiment of the present invention (shown in FIGS. 6A, 6B and 6C) in an extended position.

FIG. 6A is a left side elevation view of a second additional embodiment of a wheel fairing device 300 in accordance with the present invention with a fairing body 301 in deployed position. FIG. 6B is the corresponding view, with the fairing body 301 in the retracted position. FIG. 6C is a rear cross-sectional view of the second additional embodiment in deployed position. FIG. 6D is a perspective rear three-quarter view of a front pantographic guide linkage 304 that is used in this embodiment.

This second additional embodiment is structurally and operationally the same as the basic embodiment described above, with some exceptions. These exceptions are that the fairing body guide 350 consists of a pair of pantographic guide linkages, a front pantographic guide linkage 304 located above the leading element 313 and a rear pantographic guide linkage 305 located on the wheel pant 328. Additionally, the upper support bracket 302 is mounted directly to the fairing body 301, and the fairing body 301 does not include a trailing element.

As shown in FIG. 6D, the front pantographic guide linkage 304 includes an upper plate 360 and a lower plate 361 that are connected by two sets of folding support rod pairs, the inner folding support rod pair 362 and the outer folding support rod pair 363. The rear end of each part of each folding support rod pair is articulated through a support rod hinge 364 to either the upper plate 360 or the lower plate 361, while the front end of each part of each folding support rod is articulated through a support rod slider 365 to either the upper plate 360 or the lower plate 361. The rear pantographic guide linkage 305 is of the same form as described for the front pantographic guide linkage 304.

The upper plate 360 of the front pantographic guide linkage 304 is secured to the top of the leading element depression 326 while the upper plate 360 of the rear pantographic guide linkage 305 is secured to the top of the wheel housing 116. The lower plate 361 of the front pantographic guide linkage 304 is secured to the top of the leading element 313, while the lower plate 361 of the rear pantographic guide linkage 305 is secured to the top of the wheel pant 328 of the fairing body 301.

The upper support bracket 302 is attached directly to the fairing body 301 and is designed to engage a lower support bracket 303 mounted to the end of the upper control arm 120 of the suspension. Because the upper support bracket 302 moves vertically (in line with the movement of the front pantographic guide linkage 304 and rear pantographic guide linkage 305), while the lower support bracket 303 moves in a shallow arc determined by the length and orientation of the upper control arm 120, the upper support bracket 302 and lower support bracket 303 must be designed to accommodate a small degree of movement between their respective bearing surfaces.

The wheel fairing retractor 390 consists of a linear refraction actuator 310 mounted within the vehicle body 118 that is adapted to pull a retraction cable 351 through a pulley 352 that lifts the fairing body 301 vertically. Unlike the basic embodiment, the fairing body 301 moves in a straight line, rather than through a short arc. When the fairing body 301 is deployed, the retraction cable 351 must have sufficient slack to accommodate the full range of motion of the fairing body 301 in its deployed position.

There are other arrangements of guide linkage that will achieve a similar result of substantially constraining the horizontal position of the fairing body 301 while allowing the fairing body 301 to freely move vertically. For example, a vertically-oriented telescoping rod or a rod and track or a rod and linear bearing could be used, among other possible types of fairing body guide. A pivotably-mounted guide linkage, like that of the basic embodiment, may also be combined with, for example, an appropriately-mounted, vertically-oriented telescoping rod to produce a fairing body guide that is analogous to the arrangement seen in a McPherson Strut suspension system.

Third Additional Embodiment

FIGS. 7A, 7B

Figure 7A:
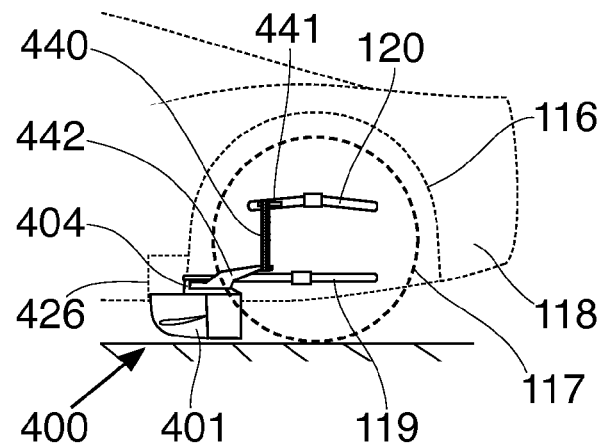
FIG. 7A is a left side elevation view of the third additional embodiment of the present invention with the fairing body 401 in deployed position.
Figure 7B:
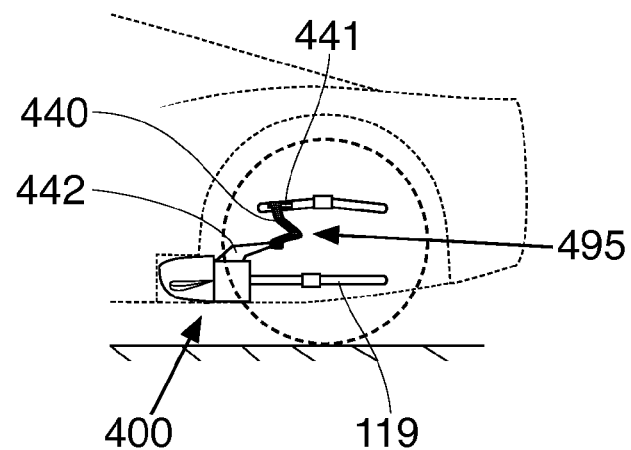
FIG. 7B is a left side elevation view of the third additional embodiment of the present invention (shown in FIG. 7A) with the fairing body 401 in refracted position.

FIGS. 7A and 7B are left side elevation views of a third additional embodiment of a wheel fairing device 400 in accordance with the present invention with the fairing body 401 in deployed (FIG. 7A) and retracted (FIG. 7B) positions. This third additional embodiment is structurally and operationally the same as the first additional embodiment of the present invention described above, with a few exceptions. These exceptions are that the simple fairing body 401, when deployed, is supported from the suspension by a support linkage 440 that depends from the upper control arm 120 of the suspension, rather than pressing upon the suspension as in the basic embodiment and the other additional embodiments described herein. It therefore lacks an upper support bracket 102 and a lower support bracket 103.

The support linkage 440 consists of a length of Kevlar webbing secured at its upper end to the upper control arm 120 through the support linkage upper mounting bracket 441 and secured at its lower end to the simple guide linkage 404 through a support linkage lower mounting bracket 442. The simple guide linkage 404 is positioned below the upper control arm 120. When the simple fairing body 401 is retracted, the support linkage 440 goes slack and the suspension of the vehicle may move vertically while the simple fairing body 401 is held fixed within the simple wheel fairing depression 426. Other suitable support linkages may be made from other suitable materials, such as cable, roller chain, or an articulating pair of arms, for example, among other possibilities. The support linkage should have the property that it transmits force in tension, but not substantial force in compression. A suitable support linkage must also allow for the functional disengagement of the wheel fairing device 400 upon refraction. A spring, if used as a support linkage, does not serve this purpose well because it does not allow for the complete functional disengagement of the wheel fairing device 400 from the suspension of the vehicle.

The support linkage 440, support linkage upper mounting bracket 441, and support linkage lower mounting bracket 442 of this embodiment comprise a further example of a suspension-mounted support 495 for the wheel fairing device 400 described herein. Another suspension-mounted support described herein is exemplified by the upper support bracket 102 and lower support bracket 103 of the basic embodiment.

Unlike the other embodiments of the present invention described herein, in this additional embodiment there is always a physical connection between the suspension system and the wheel fairing device 400 through the support linkage 440 when the wheel fairing device 400 is retracted. A support linkage 440 may also be used to functionally engage the wheel fairing and suspension in the other embodiments of the present invention described herein.

Fourth Additional Embodiment

FIGS. 8A, 8B

FIG. 8A is a front three-quarter perspective view of a fourth additional embodiment of a wheel fairing device 500 in accordance with the present invention with the fairing body 501 in deployed position. FIG. 8B is the corresponding view of the same embodiment with the wheel fairing device 500 in retracted position.

This fourth additional embodiment has an upper guide linkage 504 connected to the vehicle body through the upper guide linkage basal hinge 506 and connected to the end of a vertical extension of the fairing body 501 through the upper guide linkage apical hinge 507. The fourth additional embodiment also has a lower guide linkage 505 connected to the vehicle body 118 through the lower guide linkage basal hinge 508 and connected to the fairing body 501 through the lower guide linkage apical hinge 509. The two guide linkages maintain the orientation of the fairing body 501 relative to the body of the vehicle as the fairing body moves vertically.

The fairing body 501 bears a prominently developed dive plane 539 that is exposed to the airflow generated by travel of the motor vehicle 198 at all times, even when the fairing body 501 is in its retracted position. Unlike the other embodiments of the present invention herein described, the wheel fairing retractor 590 consists of a retraction spring 510 supplemented by a retraction counter weight 580. The retraction spring 510 and refraction counter weight 580 are adapted to hold the wheel fairing device 500 in its retracted position by imparting an upward torque sufficient to counter the downward torque imparted by the mass of the wheel fairing device 500. The retraction spring 510 imparts an upward torque at the base of the lower guide linkage 505 while the retraction counter weight 580 is connected to the base of the lower guide linkage 504 at the lower guide linkage basal hinge 508.

The dive plane 539 is designed to generate a downward force that increases as the forward speed of the motor vehicle 198 increases. This is possible because aerodynamic forces tend to increase proportionally with the square of air speed. Above a certain forward speed threshold, the downward torque imparted by the dive plane 539 exceeds the upward torque imparted by the retraction spring 510 and retraction counter weight 580. The result is that the simple fairing body 501 is automatically deployed above a designed vehicle speed threshold. An example of a useful speed threshold for this purpose is 70 km/h. Below 70 km/h the roadway may often be less suitable for deployment and aerodynamic forces tend to be less significant, while at or above 70 km/h the roadway tends to be of a smooth nature and suitable for deployment of the wheel fairing device 500. Other vehicle speed thresholds may, of course, be used.

In its deployed state, the fairing body 501 is supported normally by the suspension of the vehicle. Therefore, in its deployed state, the fairing body 501 reciprocates with the vehicle wheel 117. Thus, unlike other embodiments of the present invention, deployment of the fairing body 501 is dependent upon vehicle speed and is aerodynamically induced.

The retraction spring 510 is in the form of a torsion spring as illustrated in this embodiment, but other types of spring, such as a coil spring, gas spring, or other suitable means to impart an upward refraction force on the fairing body 501 may be used for this purpose. Alternatively, I contemplate that one may elect to employ only a retraction spring 510 of suitable strength without a retraction counter weight 580, or to employ only a refraction counter weight 580 of suitable mass without a retraction spring 510.

Additionally, I contemplate that the dive plane 539 may be of any form that would generate a suitable level of downforce that is sufficient to deploy the fairing body 501. Such downforce may, alternatively, be imparted by the overall shape of the fairing body 501 or other aerodynamic elements of the fairing body 501. The aerodynamic element that generates the downward force may alternatively be positioned on one or more other components of the wheel fairing device 500 of this embodiment, including the lower guide linkage 505, or on one or more structures physically connected to the wheel fairing device 500. A structure or set of structures that is adapted to deploy the wheel fairing device 500 through an aerodynamic force is herein termed an "aerodynamic deployer".

A mechanism to prevent deployment may be incorporated. Such a mechanism may be made speed dependent so that the wheel fairing device 500 is not deployed until vehicle speed well exceeds the forward speed threshold for the aerodynamic deployment of the wheel fairing device 500. This would prevent the wheel fairing device 500 from being alternately deployed and refracted in too rapid a succession.

Fifth Additional Embodiment

FIGS. 9A, 9B

Figure 9A:
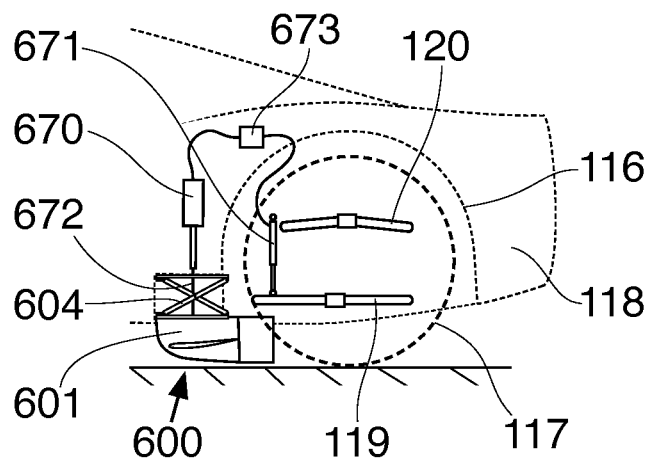
FIG. 9A is a left side elevation view of the fifth additional embodiment of the present invention with the fairing body 601 in deployed position.
Figure 9B:
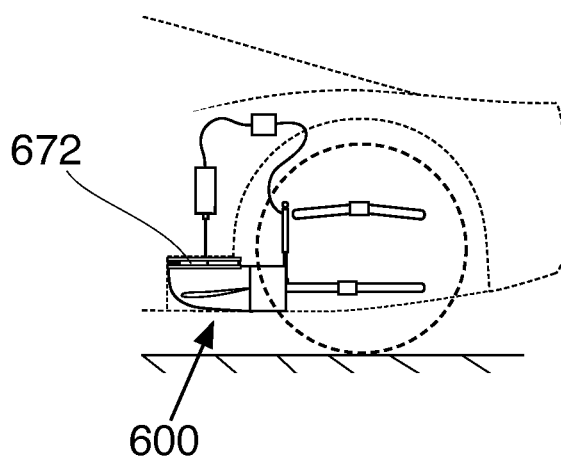
FIG. 9B is a left side elevation view of the fifth additional embodiment of the present invention (shown in FIG. 9A) with the fairing body 601 in refracted position.

FIG. 9A is a left side elevation view of a fifth additional embodiment of a wheel fairing device 600 in accordance with the present invention, with the fairing body 601 in deployed position. FIG. 9B is the corresponding view of the same embodiment, with the fairing body 601 in retracted position. Unlike the other embodiments disclosed herein that are mechanically moved by the suspension of the vehicle to reciprocate with the wheel 117, the fairing body 601 of this fifth additional embodiment is moved by a fairing body position actuator 670 that is responsive to a suspension position sensor 671.

Unlike the other embodiments described herein, there is no direct contact between the fairing body 601 and the suspension of the vehicle. The suspension position sensor 671 is a linear potentiometer connected to the vehicle body 118 and to a point on the lower control arm 119. Other suitable sensor means may be used instead, to sense suspension position and thus the ride height of the vehicle body 118 adjacent to the wheel 117.

More generally, a ride height sensor adapted to sense the ride height of the vehicle body 118 adjacent to the wheel 117 may be used, including a suspension position sensor 671 as described. Such a ride height sensor may be, for example, a body-mounted laser distance sensor adapted to measure the distance between the roadway and the vehicle body 118 adjacent to the vehicle wheel 117. Other ride height sensor means may be used instead.

The fairing body position actuator 670 is connected to a support linkage 672 that is connected with the fairing body 601. The support linkage is in the form of a cable in this embodiment that transmits the lifting force of the wheel fairing position actuator 670 to the fairing body 601, but does not transmit substantial upward force from the fairing body 601 to the fairing body position actuator 670. This serves to protect the fairing body position actuator 670 from damage should the fairing body 601 receive an upward force through contact with, for example, the roadway 199 or an object thereon.

The vertical movement of the fairing body is guided throughout its range of motion by a pantographic guide linkage 604. Other types of fairing body guide may be used instead. Alternatively, the support linkage 672 may be adapted to determine the path of movement of the fairing body 601 on its own and thus serve as both a support linkage and a fairing body guide. Such a support linkage 672 may be in the form of an inflexible rod fixedly attached to the fairing body position actuator 670 and fixedly attached to the fairing body 101. The fairing body position actuator 670 may be of any appropriate type that is capable of movement that approximates the speed of most suspension movements, including an electric linear actuator.

The suspension position sensor 671 senses the position of the suspension and outputs a corresponding value to a fairing body height ECU (electronic control unit) 673. The fairing body height ECU 673 is adapted to output an appropriate signal to the fairing body position actuator 670 so that the fairing body 601 assumes a position that corresponds with the position of the corresponding vehicle wheel 117 or to the ride height of the vehicle body 118 adjacent to the vehicle wheel 117. The fairing body height ECU 673 may also be made receptive to other sensor means, such as a speed sensor, a driver-operated refraction switch, and to other processor means, such as a vehicle stability assist system, and adapted to generate appropriate output pertaining to the ride height of the fairing body 601 dependent upon that input.

Although the detailed description above contains many specifics, these should not be construed as limiting the scope of the invention. Instead, the detailed description should be read as illustrating some of the presently preferred embodiments. The scope of the disclosed subject matter should, therefore, be determined by the appended claims and their legal equivalents, rather than merely by the examples given above.

Having thus described the invention, what I desire to protect by Letters Patent and hereby claim is:

1. A wheel fairing device adapted to reciprocate with a wheel of a motor vehicle, said wheel being connected to the body of said motor vehicle through a suspension system adapted to permit relative vertical displacement between said wheel and said body of said motor vehicle, said wheel fairing device comprising:
   a. a fairing body adjacent to said wheel and adapted to produce at least one of the following effects: a reduction in aerodynamic drag; an increase in downforce; an increase in airflow to the brake; a decrease in wheel spray,
   b. a fairing body guide adapted to determine the path of movement of said fairing body relative to said body of said motor vehicle, wherein said fairing body guide does not substantially limit the vertical movements of said fairing body relative to said body of said motor vehicle, and
   c. a suspension-mounted support for dynamically supporting said wheel fairing device when said wheel fairing device is engaged with said suspension system, said suspension-mounted support being adapted so that said wheel fairing device reciprocates with said wheel such that said wheel fairing device maintains a more constant distance above a roadway being traversed than maintained by said body of said motor vehicle when said wheel fairing device is engaged with said suspension system, wherein said wheel fairing device is constrained in the downward direction relative to said wheel and not substantially constrained in the upward direction relative to said wheel.

2. The wheel fairing device of claim 1, further including a wheel fairing retractor for elevating and lowering said wheel fairing device relative to said body of said motor vehicle, wherein elevation of said wheel fairing device to said body of said motor vehicle functionally disengages said wheel fairing device from said suspension system so that said wheel fairing device does not reciprocate with said wheel relative to said body of said motor vehicle, and wherein lowering of said wheel fairing device from said body of said motor vehicle functionally engages said wheel fairing device with said suspension system so that said wheel fairing device reciprocates with said wheel relative to said body of said motor vehicle.

3. The wheel fairing device of claim 2, wherein said wheel fairing retractor elevates and lowers said wheel fairing device through said fairing body guide.

4. The wheel fairing device of claim 2, further including a driver-operable retraction switch adapted to be actuated by a driver of said motor vehicle and operatively connected to said wheel fairing retractor.

5. The wheel fairing device of claim 2, further including a retraction control ECU and a vehicle speed sensor, wherein said retraction control ECU is operatively connected to said wheel fairing retractor and responsive to output from said vehicle speed sensor, wherein said retraction control ECU is adapted to deploy said wheel fairing device when the speed of said motor vehicle equals or exceeds a programmed vehicle speed threshold.

6. The wheel fairing device of claim 2, further including a wheel fairing upward constraint adapted to constrain movement of said wheel fairing device in an upward direction relative to said wheel when said wheel fairing device is engaged with said suspension system.

7. The wheel fairing device of claim 2, wherein said fairing body guide includes a linkage fixedly attached to said fairing body and pivotably attached to at least one of the following structures: said body of said motor vehicle; the basal portion of said suspension system of said motor vehicle.

8. The wheel fairing device of claim 2, wherein said fairing body guide includes two linkages, each pivotably attached to said fairing body and pivotably attached to at least one of the following structures: said body of said motor vehicle; the basal portion of said suspension system of said motor vehicle.

9. The wheel fairing device of claim 8, wherein said fairing body guide is adapted to substantially maintain the orientation of said fairing body with respect to said body of said motor vehicle as said fairing body moves vertically.

10. The wheel fairing device of claim 1, further comprising:
    a. a wheel fairing retractor for elevating said wheel fairing device relative to said body of said motor vehicle, wherein elevation of said wheel fairing device to said body of said motor vehicle functionally disengages said wheel fairing device from said suspension system so that said wheel fairing device does not reciprocate with said wheel relative to said body of said motor vehicle, and wherein said wheel fairing retractor is adapted to provide an upward force sufficient to maintain said wheel fairing device in a retracted position when said wheel fairing device is not subjected to a sufficient downward aerodynamic force acting upon a component of said wheel fairing device
    b. an aerodynamic deployer for lowering said wheel fairing device away from said body of said motor vehicle, wherein lowering of said wheel fairing device from said body of said motor vehicle functionally engages said wheel fairing device with said suspension system so that said wheel fairing device reciprocates with said wheel relative to said body of said motor vehicle, and wherein said aerodynamic deployer includes an aerodynamic element of said wheel fairing device adapted to produce a downwardly directed, aerodynamically induced force sufficient to deploy said wheel fairing device when the speed of said motor vehicle equals or exceeds a vehicle speed threshold.

11. The wheel fairing device of claim 10, wherein said wheel fairing retractor includes a spring adapted to maintain said wheel fairing device in a retracted position when the speed of said motor vehicle is below said speed threshold.

12. A wheel fairing device adapted to reciprocate with a wheel of a motor vehicle, said wheel being connected to the body of said motor vehicle through a suspension system adapted to permit relative vertical displacement between said wheel and said body of said motor vehicle, said wheel fairing device including:
   a. a fairing body adjacent to said wheel, said fairing body being adapted to produce at least one of the following effects: a reduction in aerodynamic drag; an increase in downforce; an increase in airflow to the brake; a decrease in wheel spray,
   b. a fairing body height adjustment actuator adapted to vary the height of said fairing body,
   c. a ride height sensor adapted to sense the ride height of said body of said motor vehicle in proximity to said wheel,
   d. a fairing body height electronic control unit responsive to said ride height sensor and operatively connected to said fairing body height adjustment actuator, said fairing body height electronic control unit being adapted to generate output to said fairing body height adjustment actuator such that said fairing body reciprocates with said wheel in such manner that said fairing body maintains a more constant height above the roadway than said body of said motor vehicle in proximity to said wheel as said motor vehicle traverses a roadway,
   e. a support linkage connecting said fairing body height adjustment actuator and said fairing body, said support linkage adapted to transmit vertical movement output from said fairing body height adjustment actuator to said fairing body, and
   f. a fairing body guide adapted to determine the path of movement of said fairing body, wherein said fairing body guide does not substantially limit the vertical movements of said fairing body relative to said body of said motor vehicle.

13. The wheel fairing device of claim 12, wherein said support linkage and said fairing body guide are the same structure.

14. The wheel fairing device of claim 12, wherein said ride height sensor is a suspension position sensor.

15. The wheel fairing device of claim 12, wherein said fairing body guide is adapted to substantially maintain the orientation of said fairing body relative to said body of said motor vehicle as said fairing body moves vertically.

* * * * *